United States Patent [19]

Tajali

[11] Patent Number: 5,404,269
[45] Date of Patent: Apr. 4, 1995

[54] METER SOCKET PAN AND ASSEMBLY
[75] Inventor: Gholam R. Tajali, Nashville, Tenn.
[73] Assignee: Square D Company, Palatine, Ill.
[21] Appl. No.: 141,835
[22] Filed: Oct. 22, 1993
[51] Int. Cl.$^6$ .............................................. H02B 1/00
[52] U.S. Cl. ................................... 361/669; 361/823; 439/517
[58] Field of Search ........................... 324/149, 156; 361/659–671, 822, 823; 439/517, 751, 839

[56] References Cited

U.S. PATENT DOCUMENTS

| | | | |
|---|---|---|---|
| 3,355,630 | 11/1967 | Orr | 361/669 |
| 5,207,595 | 5/1993 | Learmont et al. | 439/517 |

Primary Examiner—Gregory D. Thompson
Attorney, Agent, or Firm—Larry I. Golden; Kareem M. Irfan

[57] ABSTRACT

The present invention provides a meter socket pan and assembly for connection of an electrical meter between a line bus terminal and a branch load terminal. The pan includes a one-piece support base having a generally flat front face and a back face, and a top, bottom and side edges. The base is made of a non-conductive plastic material adapted to support the electrical meter. A socket base is integrally formed on one end of the front face of the support base. The socket base electrically and mechanically connects to an electrical meter. A test base is integrally formed on the opposite end of the front face of the support base. The test base secures thereto a line and load terminal. The test base also reversibly closes the circuit between the line and load terminals. The socket pan also electrically connects the socket base and the reversibly closing test base.

14 Claims, 3 Drawing Sheets

METER SOCKET PAN AND ASSEMBLY

RELATED APPLICATION

Related co-pending U.S. application Ser. No. 08/142,255 filed on even date herewith discloses one class of distribution boards which is suitable for use with the present application. The entire teaching and disclosure of that co-pending application is incorporated herein by reference.

1. Field of the Invention

The present invention relates to metering equipment for electrical power and, particularly, to a one-piece molded meter socket pan and assembly made of electrically insulating, non-conductive plastic.

2. Background of the Invention

Support bases for electrical equipment, like meter socket pans and assemblies, have traditionally been formed from metal. These metallic meter socket pans are usually mass-produced from metal sheets in a succession of operations including cutting, blanking, forming and welding, to create a mounting base which is then usually electrostatically painted. Since the metallic support base is electrically conductive, insulators must be used for mounting the various components on the support base.

Several problems arise from the need to insulate the components mounting to the metallic support base. The use of insulators increases the number of parts to assemble and inventory. Well-trained personnel are required to avoid creating a safety hazard if the insulators are not properly positioned or inadvertently omitted.

The need to use so many manufacturing operations to make a metallic support base severely limits the simultaneous manufacture of other components integral with the support base. This limitation requires that every component be assembled after the metallic support is made. Again, the number of parts and cost of assembly can not be decreased. Attempts to integrally form components while making a mettalic support with a more complicated or detailed design are usually outweighed by a dramatic increase in manufacturing costs.

The art needs a new and improved meter socket pan assembly which allows simultaneous manufacture of the support pan and components thereon. This will decrease the bill of materials for the total assembly, reduce assembly time and cut the cost of the assembly while providing a safer product. The present invention provides such an improved meter socket pan and assembly.

SUMMARY OF THE INVENTION

In accordance with the present invention, a meter socket pan for connection of an electrical meter between a line bus terminal and a branch load terminal is provided.. The pan includes a one-piece support base having a generally flat front face and a back face, and a top, bottom and side edges. The base is made of a non-conductive plastic material adapted to support the electrical meter. A socket base is integrally formed on one end of the front face of the support base. The socket base having means for electrically and mechanically connecting to an electrical meter. A test base is integrally formed on the opposite end of the front face of the support base. The test base having means for securing thereto a line and load terminal. The test base also having means for reversibly closing the circuit between the line and load terminals. The socket pan also includes means for electrically connecting the socket base means and the circuit closing means.

In further accordance with the present invention a meter socket assembly is provided for connection of an electric meter between a line bus and a branch load. The meter socket assembly includes a one-piece support base having a generally flat front face and a back face, and a top, bottom and side edges. The base is made of a non-conductive plastic material adapted to support the electrical meter. A socket base is integrally formed on one end of the front face of the support base. The socket base having means for electrically and mechanically connecting to an electrical meter. A test base is integrally formed on the opposite end of the front face of the support base. The test base having means for securing thereto pluralities of line and load terminals. The test base also having means for reversibly closing the circuit between the line and load terminals. The plurality of terminals having one end connecting to the closing means and the opposite end adapted for electrically connecting to branch lines. The plurality of line terminals having one end connecting to the circuit closing means and the opposite end adapted for electrically connecting to a line bus. The assembly also includes means for electrically connecting the socket base means and the circuit closing means and mounting means connected to the support base for positioning the assembly relative to the circuit for connection to the line bus and branch lines.

It is an object of the present invention to provide a meter socket pan made of non-conductive plastic which overcomes the aforementioned problems affecting the proper insulation of components mounted on the pan.

Another object is to provide safety protection against incidental misalignment or omission during the assembly of numerous parts.

Still another object is to provide a meter socket assembly which is inexpensively and reliably assembled by decreasing the total number of parts and manufacturing steps.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure.

DETAILED DESCRIPTION

Figure 1:
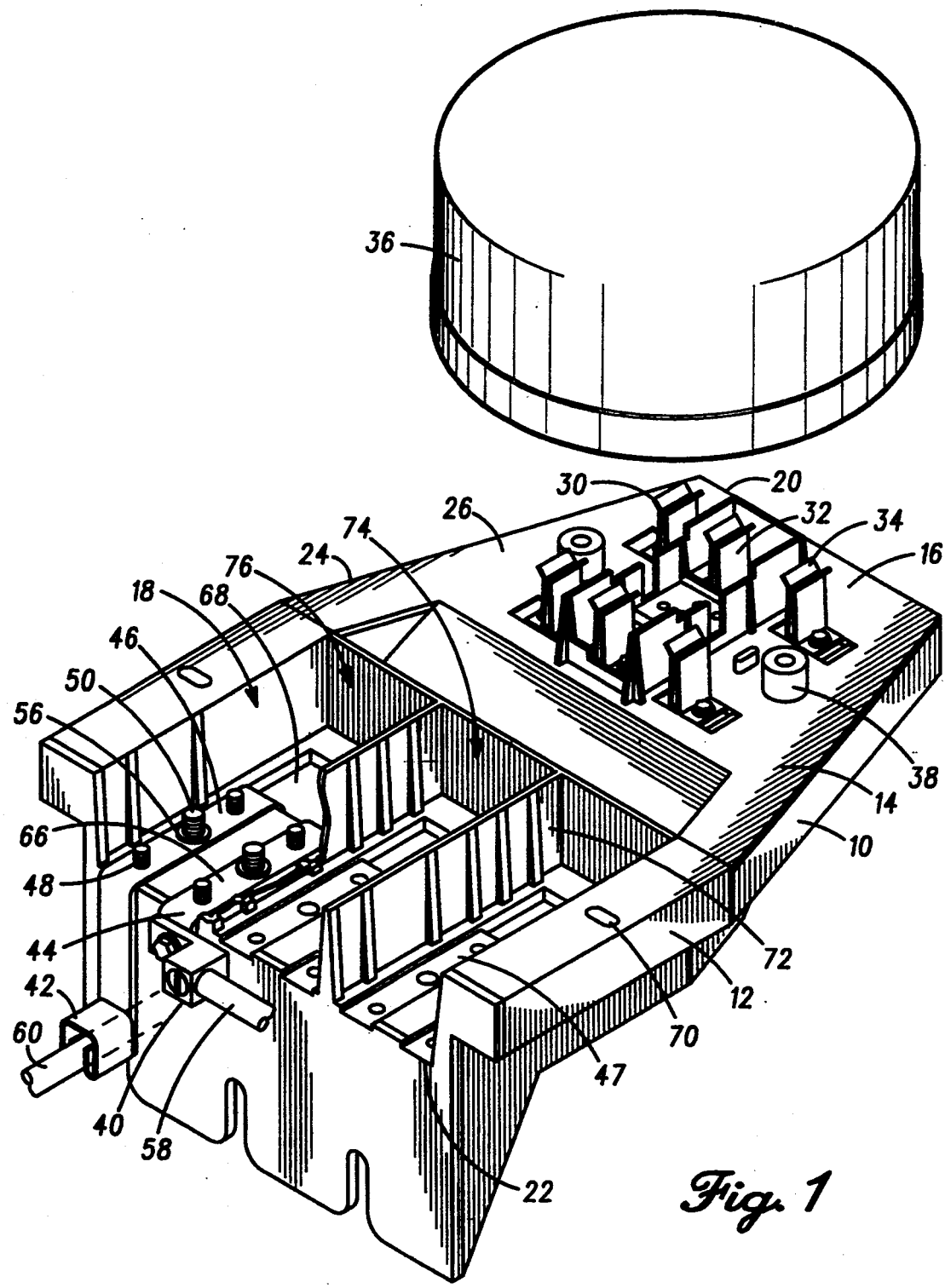
FIG. 1 is a front perspective view of a meter socket assembly of the present invention.
Figure 2:
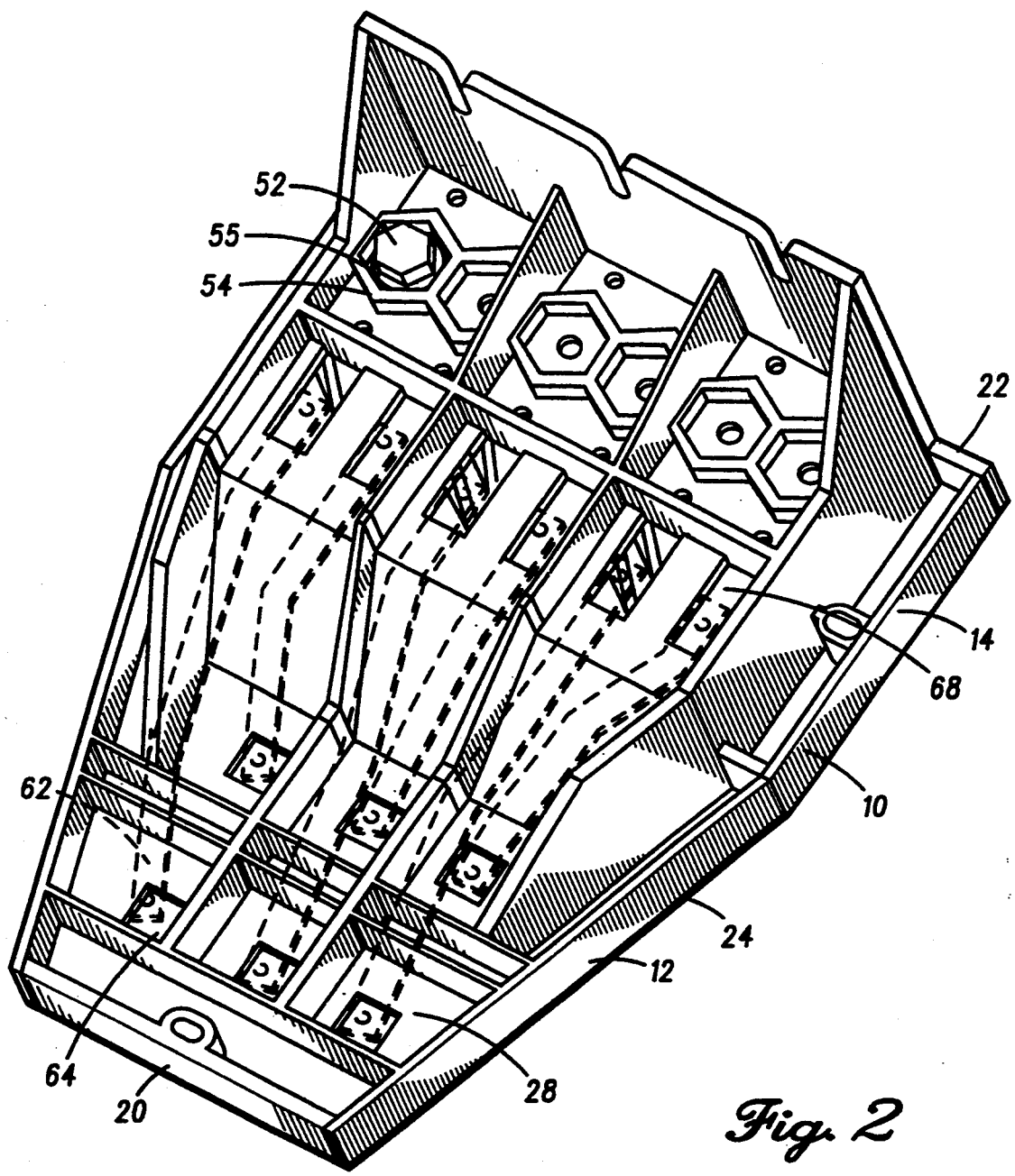
FIG. 2 is a back perspective view of the meter socket pan illustrated in FIG. 1.
Figure 3:
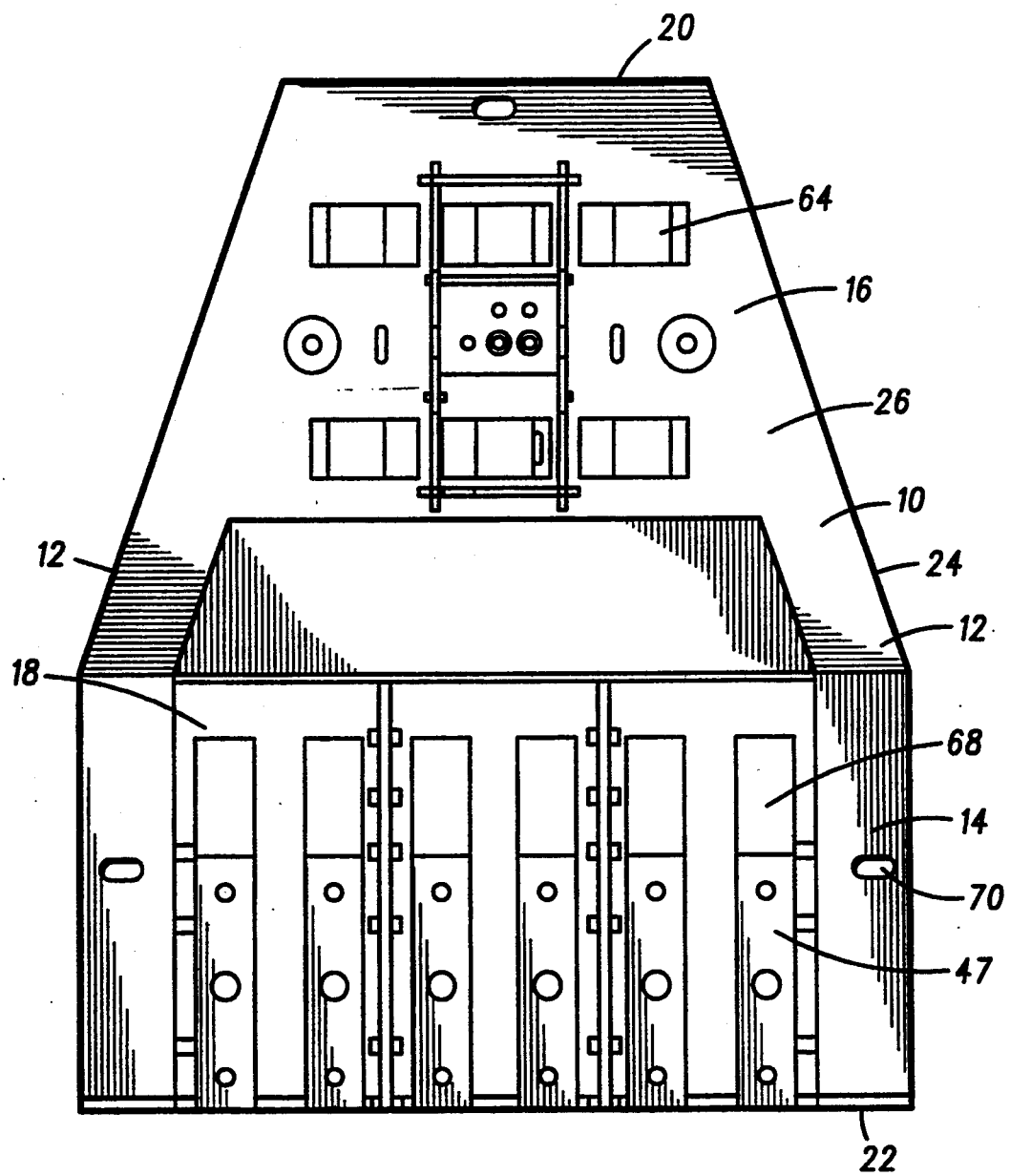
FIG. 3 is a top plan view of a meter socket assembly of the present invention.

Referring now to the drawings there is illustrated a meter socket assembly 10 embodying the present invention. In FIGS. 1 through 3, the meter socket assembly 10 includes a socket pan 12 having a one-piece support base 14, a socket base 16, and a test base 18.

The support base 14 is defined by a top edge 20, a bottom edge 22 and side edges 24 with a generally flat shape having a front face 26 and a back face 28. The support base is made of a non-conductive plastic material.

The socket base 16 is integrally formed on one end of the front face 26 of the support base. Preferably, the socket base 16 is positioned near the top edge 20. Secured to the socket base 16 are a plurality of terminal clip pairs 30, 32, 34. The attachment of the terminal clip pairs like 30 to the socket base 16 without the need for an insulative layer demonstrates one of the advantages of the present invention.

At least two terminal clip pairs like 30 and 34 are adapted for electrical connection to a conventional meter 36. Other means for electrically and mechanically connecting the meter 36 are contemplated by the present invention. Mounts 38 are used to secure a cover (not shown) over the meter 36.

The test base 18 is integrally formed on the opposite end of the front face 26 of the support base. Preferrably, the test base 18 is positioned near the bottom edge 22. A plurality of load terminals 40 and line terminals 42 are secured to the test base 18 by respectively connecting to corresponding load bars 44 and line bars 46.. Each load bar 44 and line bar 46 are fastened within channels 47 on the front face 26 by screws 48. Other means of securing the load and line terminals to the test base 18 are suitable for use with the present invention.

The test base 18 also includes a stud 50 positioned at the end of each load bar 44 and line bar 46. Each stud 50 extends through the support base 12 from the back face 28. As specifically illustrated in FIG. 2, the head 52 of the stud fits snugly in a corresponding sized retaining wall 54 which is integrally formed with the back face 28. A conventional retaining washer 55 locks the stud 50 securely within the retaining wall 54.

Returning to FIG. 1, the stud 50 makes electrical contact with the one of the line bars 46 or load bars 44 by tightening a conductive washer 56 into contact with the bars. The electrical connection is reversibly broken by removing the conductive washer 56. Other means for reversibly closing the circuit between the line and load terminals are contemplated by the present invention.

There is no need to provide an insulator around the stud 50 because of the non-conductive support base 14. This demonstrates another advantage of the present invention by reducing the number of parts needed to assemble the circuit closing means.

The plurality of load terminals 40 are adapted for electrically and mechanically connecting to branch lines like cable 58. Preferably, a lug-type terminal is used for the connection. Each load terminal like 40 connects to one end of the corresponding load bar 44. Each load terminal 40 is positioned below the bottom edge 22 of the socket pan in a different, yet overlapping, plane from the remainder of the load terminals 40. The branch lines 58 extend from the load terminals 40 in a direction generally parallel to the bottom edge 22.

The plurality of line terminals 42 are adapted for electrically and mechanically connecting to bus bars like 60. Preferably, a contact jaw-type terminal is used for the connection. Each line terminal like 42 connects to one end of the corresponding line bar 46. Each line terminal 42 is preferrably positioned below the bottom edge 22 and beyond the back face 28 of the socket pan in approximately the same plane. Each line bar 46 extends downwardly from the test base 18 past the bottom edge 22 and beyond the back face 28. This positions the line terminals 42 to allow easy attachment to the bus bar 60 by pushing against the front face 26 of the socket pan.

As best illustrated in FIGS. 1 and 2, the socket base means and the circuit closing means are electrically connected by providing a plurality of first bars 62 and a plurality of apertures 64 in the socket base 16. One socket aperture is positioned next to each of the terminal clips 30, 32, 34. One of the first bars 62 is connected to one of the terminal clips 30, 32, 34. Each first bar 62 extends through the corresponding socket aperture 64 to extend along the back face 28 of the support base.

A plurality of second bars 66 and a plurality of apertures 68 in the test base are provided to complete the connection to the circuit closing means. One of the test apertures 68 is positioned next to each stud 50. Each first bar 62 connects to one end of a corresponding second bar 66. The opposite end of the second bar 66 extends through the test aperture 68 and is secured on the front face 26 of the test base 18 next to the stud 50. The second bar 66 is positioned to make electrical contact with the conductive washer 56 when it is tightened.

The meter socket assembly 10 includes mounting holes like 70 in the front face 26 of the support base 14. The mounting holes 70 positions the assembly 10 relative to the circuit for connection to the bus bar 60 and the branch lines 58.

The meter socket assembly 10 also includes a plurality of upstanding walls positioned parallel to one another and dividing the test base 18 into separate modules like 74 and 76. Each load bar 44 and line bar 46 is positioned within a module like 74. The upstanding walls 72 provides an interphase barrier between the modules like 74, 76.

The present invention has been illustrated in the Figures as a multiphase circuit. The present invention is also applicable to single phase circuits with appropriate modification. A single phase connector bar (not shown) electrically connects two of the line bars 46. The interconnected line bars then share one line terminal 42. The single phase connector bar can electrically short the B-phase to the C-phase or the B-phase to the A-phase.

The meter socket pan 12 is preferably injection-molded. Preferably, the non-conductive plastic used is a thermoset resin like a glass-filled polyester. An example of a polyester with glass fill is commercially available from PreMix, Inc. of North Kingsville, Ohio under catalog number 3200SMC. Other thermoset plastics suitable for use with the present invention include conventional bulk molding composites and sheet molding composites. Other thermoset plastics which are electrically insulating and have the structural strength to support the components are also suitable.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A meter socket pan for connection of an electrical meter between a line bus terminal and a branch load terminal, the pan comprising:

a one-piece support base having a generally flat front face and a back face, and a top, bottom and side edges, the support base made of a non-conductive plastic material adapted to support the electrical meter;

a socket base integrally formed on one end of the front face of the support base, the socket base having socket base means for electrically and mechanically connecting to an electrical meter;

a test base integrally formed on the opposite end of the front face of the support base, the test base having means for securing thereto a line and load terminal, the test base having means for reversibly closing the circuit between the line and load terminals without disconnecting the line bus or branch load; and means for electrically connecting the socket base means and the circuit closing means.

2. The pan of claim 1 wherein the non-conductive plastic material is a thermoset resin.

3. The pan of claim 2 wherein the thermoset resin is selected from the group consisting of glass-filled polyester, sheet molding composites, and bulk molding composites.

4. The pan of claim 1 wherein the socket base means comprises at least two pairs of terminal clips adapted for electrically and mechanically connecting to the electrical meter, each terminal clip being secured to the front face of the support base.

5. The pan of claim 1 wherein the test base comprises a plurality of apertures through the support base in proximity of the test base, each test aperture adapted to receive the connecting means for each pair of load and line terminals, and the socket base comprising a plurality of apertures in the proximity of the socket base, each socket aperture adapted to receive the connecting means for the socket base means.

6. The pan of claim 1 wherein the support base further comprises a plurality of upstanding walls positioned parallel to one another and dividing the test base into separate modules adapted to secure each load and line terminal.

7. A meter socket pan for connection of an electrical meter between a line bus terminal and a branch load terminal, the pan comprising:

a one-piece support base having a generally flat front face and a back face, and a top, bottom and side edges, the support base made of a non-conductive plastic material adapted to support the electrical meter;

a socket base integrally formed on one end of the front face of the support base, the socket base having socket base means for electrically and mechanically connecting to an electrical meter;

a test base integrally formed on the opposite end of the front face of the support base, the test base having means for securing thereto a line and load terminal, the test base having means for reversibly closing the circuit between the line and load terminals, the circuit closing means comprises a stud mounted through the support base in the proximity of the test base and positioned between the connecting means and each line and load terminal, the stud adapted to retain an electrically conductive washer across the connecting means and each line and load terminal; and means for electrically connecting the socket base means and the circuit closing means.

8. A meter socket assembly for connection of an electric meter between a line bus and a branch load, the meter socket assembly comprising:

a socket pan having a one-piece support base having a generally flat front face and a back face, and a top, bottom and side edges, the base made of a non-conductive plastic material adapted to support the electrical meter;

a socket base integrally formed on one end of the front face of the support base, the socket base having socket base means for electrically and mechanically connecting to an electrical meter;

a test base integrally formed on the opposite end of the front face of the support base, the test base having means for securing thereto pluralities of line and load terminals, the test base having means for reversibly closing the circuit between the line and load terminals without disconnecting the line bus and branch load;

the plurality of load terminals having one end connecting to the closing means and the opposite end adapted for electrically connecting to branch lines;

the plurality of line terminals having one end connecting to the circuit closing means and the opposite end adapted for electrically connecting to a line bus;

means for electrically connecting the socket base means and the circuit closing means; and mounting means connected to the support base for positioning the assembly relative to the circuit for connection to the line bus and branch lines.

9. The assembly of claim 8 wherein the socket base means comprises at least two pairs of terminal clips adapted for electrically and mechanically connecting to an electrical meter, the socket base having a plurality of apertures, one of the socket apertures located at each terminal clip;

the connecting means comprises a plurality of first bars, one of the first bars being secured to one of the corresponding terminal clips and extending downward through one of the socket apertures, a plurality of second bars, one of the second bars connecting to the opposite end of the corresponding first bar, the opposite end of each second bar connecting to the circuit closing means;

each load terminal connecting to one end of a corresponding load bar, the opposite end of each load bar connecting to the circuit closing means; and each line terminal connecting to one end of a corresponding line bar, the opposite end of the line bar connecting to the circuit closing means.

10. The assembly of claim 8 wherein the non-conductive plastic material is a thermoset resin.

11. The assembly of claim 10 wherein the thermoset resin is selected from the group consisting of glass-filled polyester, sheet molding composites, and bulk molding composites.

12. The assembly of claim 8 wherein the support base further comprises a plurality of upstanding walls positioned parallel to one another and dividing the test base into separate modules adapted to secure each load and line terminal.

13. The assembly of claim 8 wherein the circuit closing means comprises a stud mounted through the support base in the proximity of the test base, the stud being positioned next to one end of each second bar with one end of the corresponding line bar and load bar, the stud reversibly securing a conductive washer in contact with each second bar and the corresponding line bar and load bar.

14. The assembly of claim 8 wherein the assembly further includes an electrical meter connected to the socket base means for monitoring the circuit between the load and line terminals.

* * * * *